US011618680B2

(12) United States Patent
Carlsson

(10) Patent No.: US 11,618,680 B2
(45) Date of Patent: Apr. 4, 2023

(54) CARBON BASED COMPOSITE MATERIAL

(71) Applicant: Bright Day Graphene AB, Bromma (SE)

(72) Inventor: Anna Carlsson, Nacka (SE)

(73) Assignee: BRIGHT DAY GRAPHENE AB, Bromma (SE)

(*) Notice: Subject to any disclaimer, the term of this patent is extended or adjusted under 35 U.S.C. 154(b) by 77 days.

(21) Appl. No.: 16/981,141

(22) PCT Filed: Mar. 22, 2019

(86) PCT No.: PCT/EP2019/057281
§ 371 (c)(1),
(2) Date: Sep. 15, 2020

(87) PCT Pub. No.: WO2019/180227
PCT Pub. Date: Sep. 26, 2019

(65) Prior Publication Data
US 2021/0061663 A1   Mar. 4, 2021

(30) Foreign Application Priority Data

Mar. 23, 2018 (EP) .................... 18163695

(51) Int. Cl.
*C01B 32/184* (2017.01)
*C01B 32/05* (2017.01)

(52) U.S. Cl.
CPC ............ *C01B 32/184* (2017.08); *C01B 32/05* (2017.08); *C01P 2002/02* (2013.01); *C01P 2002/82* (2013.01); *C01P 2004/02* (2013.01); *C01P 2004/20* (2013.01)

(58) Field of Classification Search
CPC ..... C01B 32/05; C01B 32/182; C01B 32/184; C01B 32/19; C01P 2002/02; C01P 2002/82; C01P 2004/02; C01P 2004/20; C23C 16/26
See application file for complete search history.

(56) References Cited

U.S. PATENT DOCUMENTS

2017/0113936 A1   4/2017   Zhang et al.

FOREIGN PATENT DOCUMENTS

| CN | 101743210 A | 6/2010 |
| CN | 104681789 A | 6/2015 |
| CN | 106241780 A | 12/2016 |
| WO | WO-2008131206 A1 | 10/2008 |
| WO | 2017013111 A1 | 1/2017 |

(Continued)

OTHER PUBLICATIONS

English machine translation of CN106241780 (2016).*

(Continued)

*Primary Examiner* — Richard M Rump
(74) *Attorney, Agent, or Firm* — Harness Dickey & Pierce P.L.C.

(57) ABSTRACT

The present disclosure relates to a process for producing sheets of a composite material comprising a graphene film arranged on an amorphous carbon substrate, the process comprising the steps of: a) providing a lignin source and an aqueous solution to form a composition, b) depositing the composition on a metal surface, c) heating the composition on the metal surface to form the composite material.

20 Claims, 6 Drawing Sheets

(56) References Cited

FOREIGN PATENT DOCUMENTS

WO   WO-2017213959 A1   12/2017

OTHER PUBLICATIONS

Figure 1:
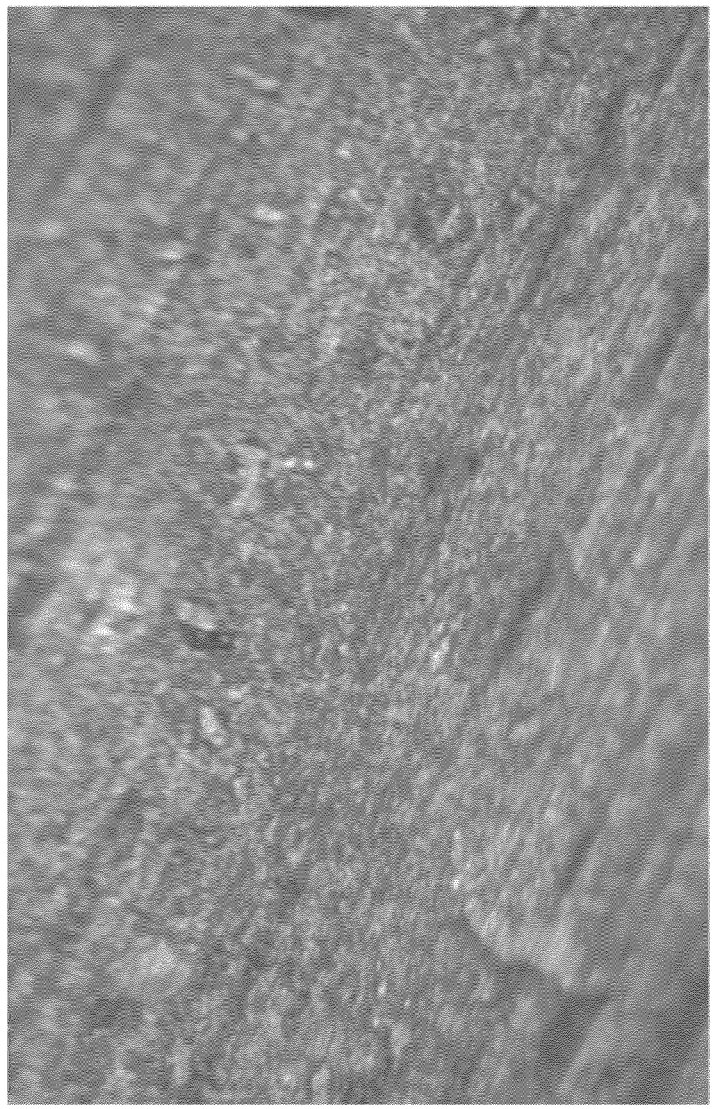

Leng, Weiqi, et al. "Low temperature synthesis of graphene-encapsulated copper nanoparticles from kraft lignin." Materials Letters 185 (2016): 131-134.*
International Search Report from PCT Application No. PCT/EP2019/057281 dated Jul. 2, 2019.
Written Opinion from PCT Application No. PCT/EP2019/057281 dated Jul. 2, 2019.
Extended European Search Report from EP Application No. 18163695.2 dated Sep. 20, 2018.
Malesevic, A., et al., "Synthesis of few-layer graphene via microwave plasma-enhanced chemical vapour deposition," Nanotechnology, 19(30):305604 (2008).
Office Action from corresponding JP Application No. 2020-549700 dated Feb. 7, 2023.

* cited by examiner

CARBON BASED COMPOSITE MATERIAL

CROSS-REFERENCE TO RELATED APPLICATIONS

This patent application is a U.S. national stage of International Patent Application No. PCT/EP2019/057281 filed on 22 Mar. 2019, which claims foreign priority to European Patent Application No. 18163695.2 filed on 23 Mar. 2018. The entire contents of each application recited above is incorporated herein by reference.

TECHNICAL FIELD

The present invention relates to a novel carbon based composite material, an intermediate carbon based composite material and a process for producing a carbon based composite material.

BACKGROUND

Two-dimensional materials, and in particular graphene, has sparked a vast interest since first being synthesized in the early $21^{st}$ century, owing primarily to their mechanical, electronic and optical properties. The use of graphene comprising materials in various applications has increased steadily since its discovery. Several methods for the manufacture of graphene has been proposed, including chemical vapor deposition (CVD) and exfoliation. The methods for producing graphene comprising material known in the art today generally suffer from several limitations, which yields a need for improved processes allowing the use of abundant and environmentally friendly materials as raw materials, and for controlling the physical properties of the material. In particular, with methods known in the art today it is generally difficult to direct the size of the graphene comprising material.

SUMMARY

It is an object of the present invention to at least alleviate some of the drawbacks of the prior art. There is a particular object to provide a process for producing a graphene composite material from a simple process using a lignin source as its raw material. Furthermore, there is an object to provide a graphene composite material having a size larger than 1 µm², such as larger than 1 mm². Yet another object to provide an intermediate material.

The above mentioned objects, as well as other objects apparent to a person skilled in the art, are each addressed by the aspects of the present invention. In first aspect thereof, the present invention provides a process for producing a composite material comprising a graphene film arranged on an amorphous carbon substrate, the process comprising the steps of
  a) providing a lignin source and an aqueous solution to form a composition
  b) depositing the composition on a metal surface
  c) heating the composition on the metal surface to form said composite material on the metal surface.

The present invention is based on the realization that a carbon based composite material comprising carbon can be produced by a simple process using an abundant carbon source, lignin, and an environmentally friendly solvent, such as water. The inventive process produces a carbon based composite material comprising a substrate of amorphous carbon onto which, on at least one side, a graphene film is adhered. The terms "adhesion" and "attachment" are used interchangeably herein and are both intended to denote the physical and/or chemical attachment of a surface of a compound to a surface of another compound.

The material produced according to the inventive process is in the form of sheets. Throughout this disclosure, the term "sheets" will be used interchangeably with the term "flakes". The two terms are intended to denote a thin piece of the composite material having a thickness of approximately a few microns and which has a size of one of its major sides of at least 1 µm², such as of at least 1 mm². The flakes generally comprise two major sides having approximately the same size.

The term "composite material" as referred to herein, should generally be understood as a material comprising at least two materials with different chemical and physical properties. The composite material produced by the inventive process comprises a substrate of amorphous carbon onto which a film of graphene is adhered. The graphene film is typically adhered to only one of the major sides of the substrate, but the present disclosure also encompasses examples where the graphene film is adhered to both major sides of the substrate.

Lignin is a carbon source which exists readily available in abundant masses in many paper producing parts of the world. Lignin is, inter alia, a by-product from paper production. In paper production lignocellulosic feedstock, such as wood, is treated in order to separate the cellulose, from which bleached paper can be produced, from lignin. Lignin is a class of complex organic polymers, typically with molecular masses in excess of 10,000 g/mol. In the present disclosure, the term lignin source is intended to denote a lignin comprising material, preferably a particulate lignin comprising material. Suitable lignin sources according to the present invention is refined lignin, purified lignin, alkali lignin and lignosulfonate, such as lignosulfonate obtained from the sulfite process in paper production, but other sources of lignin may also be contemplated. Lignin is advantageous as a carbon source in that it is readily available and relatively cheap.

The choice of lignin source may be based on the characteristics of the final product being sought after. For example, lignin sources such as lignin obtained from the sulfite process is generally hydrophilic whereas refined lignin is generally hydrophobic. The inventor has found that by choosing a more hydrophilic or more hydrophobic lignin source the properties of the final product may can be directed. For example, lignosulfonate is hydrophilic lignin source. Refined lignin is a hydrophobic lignin source. Use of a hydrophobic lignin source may yield a hydrophobic composite material. Use of a hydrophilic lignin source may yield a hydrophilic composite material.

The step of providing a lignin source and an aqueous solution to form a composition may comprise a step of mixing the components to form the composition. Mixing steps are known to a person skilled in the art.

The aqueous solution may be water.

Various ways of performing the step of depositing the composition on a metal surface include, but are not limited to, drop-casting, spin coating, dip coating, physical application, sublimation, blading, inkjet printing, screen printing, direct placement, or thermal evaporation. In one example, the step b) is performed by drop-casting. The surface may preferably be a flat surface having a quadrangular shape. Other shapes, such as round or elliptic may also be contemplated. After depositing the composition on the surface, the composition on the metal surface may be dried in order to create some adhesion between the composition and the metal surface.

The metal surface may be made of any suitable metal or alloy. However, the metal surface should preferably be capable of withstanding the step of heating without any substantial physical or mechanical changes. Suitable metals include copper, copper alloys, aluminum and aluminum alloys.

The step of heating the composition on the metal surface is preferably performed in an oven capable of heating the composition on the metal surface to a temperature of at least 500° C., such as to a temperature of at least 600° C., preferably to a temperature of at least 700° C., more preferably to a temperature of at least 800° C. The oven should preferably be capable of providing a chemically inert atmosphere to the composition on the metal surface, preferably by flowing one or several inert gases through its heating chamber. Suitable ovens are known to a person skilled in the art, but one example is tubular ovens. To form the composite material, the reaction time at the target temperature may be about 20 minutes. After the composite material has formed, the composite material is adhered to the metal substrate. The composite material on the metal substrate may thereafter be cooled to room temperature, either in an inert atmosphere or under ambient conditions.

The step of heating the composition should be performed at a temperature such that the composition forms the composite material.

In some examples, the inert environment is created by a flow of argon gas and hydrogen gas, preferably in a ratio, by weight, of about 1-10 parts hydrogen gas to 90-99 parts argon gas, such as of about 5 parts hydrogen gas to about 95 parts argon gas.

In some examples, the inert environment is created by a flow of argon gas during the heating of the oven to the reaction temperature and a flow of hydrogen gas when the oven has reached the target temperature and for the complete reaction time. After the reaction at the target temperature, the inert atmosphere may be provided by a flow of argon gas during a step of cooling the substrate to room temperature.

Alternatively, a flow of argon and hydrogen, wherein the ratio, by weight, of argon to hydrogen is in the range if 5-100 parts argon to 0-95 parts argon, may be used when the oven has reached the target temperature and for the complete reaction time at the target temperature.

Flow of argon and/or hydrogen gas may provide a pressure of at least 1 atm, preferably of at least 1.5 atm.

In examples of the present disclosure, the process of the first aspect further comprises a step d) removing the composite material from the metal surface to form sheets of the composite material. The step of removing the composite material from the metal surface to form sheets of the composite material may be performed using mechanical means. The composite material may be removed from the metal surface using chemical means. In some examples the step d) further comprises treating the composite material on the metal surface with hydrochloric acid in order to remove flakes of composite material from the metal substrate. After the flakes have been removed, a step of electrolysis can be used to collect the flakes. Mechanical means, such as brushing, may also be contemplated. After removal, the flakes may have a size of more than 1 µm$^2$, preferably of more than 1 mm$^2$, such as in the range of 1 mm$^2$-50 mm$^2$ In another example, the flakes may be removed from the metal surface using electro-delamination. Electro-delamination may be performed by allowing the metal surface to act as a first electrode, graphite to act as second electrode and sodium hydroxide as an electrolyte under an applied current. The metal surface is then transferred to water, which allows the flakes to delaminate from the copper surface. The process may be repeated in order to remove as many flakes as possible, preferably all flakes, from the metal surface. The use of electro-delamination is advantageous in that it does not consume the metal surface.

One advantage of the present invention is that the after removal from the metal surface, the flakes produced typically has a size of more than 1 µm$^2$, such as of more than 1 mm$^2$. Known methods for producing carbon based composite material generally produces nanoparticles of the composite material. Compared to nanoparticles, flakes having a size of more than 1 µm$^2$, such as of more than 1 mm$^2$ are at least thousand times larger than such nanoparticles. This is advantageous in that it provides an improved electronic conductivity. The flakes produced according to the present disclosure is suitable for use in bulk applications.

The inventive process may furthermore comprise a step of electrolyzing the flakes in order to collect them after having been removed from the metal surface.

In some examples of the present invention, the step a) further comprises providing a poly(vinyl alcohol) and an alcohol to the composition. PVA is a water soluble synthetic polymer. Preferably, the poly(vinyl alcohol) (PVA) is a PVA solution, such a PVA solution having an amount of PVA, by weight, of about 10 weight-%. The solution is preferably an aqueous solution. The PVA solution may be provided in an amount of 1-5 weight % by weight of the composition, such as about 2-4 weight-% by weight of the composition.

The inventor has surprisingly realized that by providing PVA to the composition in step a) is advantageous in that provides a more stable composite material in the form of flakes having a relatively uniform size distribution of more than 1 µm$^2$, preferably in the range of 1 µm$^2$-50 mm$^2$ or of more than 1 mm$^2$, preferably in the range of 1-50 mm$^2$ or 1 µm$^2$-1 mm$^2$. Without wishing to be bound by any specific scientific theory, it is believed that the addition of a PVA improves the phase separation of the composition from the metal surface, which makes it easier to remove from the metal surface.

The alcohol is preferably a lower alcohol, such as an alcohol comprising less than 5 carbon atoms. The alcohol is preferably a primary, secondary or tertiary alcohol. The alcohol may be iso-propanol. The amount of alcohol may be in the range of 25-70 weight-% by weight of the composition, such as in the range 45-65 weight-% by weight of the composition, preferably in the range of 50-55 weight-% of isopropanol by weight of the composition. In examples wherein the lignin source is refined lignin, the amount of alcohol may be in the range of 25-35 weight-%.

The use of a lower alcohol, such as iso-propanol is advantageous in that it lowers the surface tension of the composition, thereby facilitating an even deposition of the mixture onto the metal surface.

In examples, the composition comprises, by weight of the composition, by weight of the composition, 10-40 weight-% of the lignin source, 1-5 weight-% of poly(vinyl alcohol), and 45-65 weight-% of isopropanol, the balance comprising water. Preferably, the composition comprises, by weight of the composition, 15-30 weight-% of the lignin source, 1-5 weight-% of poly(vinyl alcohol), and 47-57 weight-% of isopropanol, the balance comprising water. More preferably, the composition comprises 18-22 weight-% of the lignin source, 1.5-4 weight-% of poly(vinyl alcohol), and 50-55 weight-% of isopropanol, the balance comprising water. In one example the composition comprises about 20 weight-% of refined lignin, about 2.5 weight-% of poly(vinyl alcohol), about 52.5 weight-% of isopropanol, and about 25 weight-% of water. In another example, the composition comprises 23-27 weight-% lignin, 1.5-4 weight-% of poly(vinyl alcohol), and 50-55 weight-% of isopropanol, the balance comprising water, such as about 25 weight-% lignin, about 2.5 weight-% of poly(vinyl alcohol), about 52.5 weight-% of isopropanol, and about 20 weight-% of water According to some examples of the present invention, the lignin source is a particulate lignin source, and wherein the step a) further comprises milling of the composition. The milling is preferably performed using a ball mill, such as a planetary ball mill using milling balls having a diameter in the range of 0.6-0.8 mm. The amount of milling balls may be in the range of 1-3 times the weight of the composition, such as about 2 times the weight of the composition.

The metal surface may be a copper surface. Copper has a high melting point of 1085° C. and provides mechanical stability at high temperatures. The copper surface is preferably a flat copper surface. The use of a copper surface has been found to provide flakes of the composite material having a uniform size distribution of more than 1 $\mu m^2$, such as of more than 1 $mm^2$, such as in the range of 1 $\mu m^2$-50 $mm^2$, preferably 1 $\mu m^2$-1 $mm^2$.

In some examples, the step c) further comprises heating the composition on the metal surface to a reaction temperature in the range of 500-1100° C. As used herein, the term "reaction temperature" is intended to denote the maximum temperature which the composition on the metal surface is exhibited for during the process. The reaction temperature may also be in the range of 600-1000° C., such as in the range of 700-900° C., preferably in the range of 750-850° C., more preferably in the range of 790-815° C., for example about 805° C. The reaction time, which corresponds to the time the composition on the metal surface is exhibited to the reaction temperature is typically in less than 1 hour, such as less than 50 minutes, preferably in the range of 10-50 minutes, such as about 30 minutes or about 20 minutes.

The step of heating is preferably performed in an oven, such as a tubular oven. Preferably, the tubular oven is capable of providing an inert atmosphere.

In some examples the reaction temperature is in the range of 750-850° C. and the reaction time is in the range of 10-50 minutes, such as for about 20 minutes.

In some embodiments the reaction temperature is in the range of 770-890° C. and the reaction time is in the range of 10-50 minutes, such as for about 30 minutes.

After being exhibited to reaction temperature for the reaction time, the composite material on the metal surface may still be exhibited for an elevated temperature, at least for the period during which the material cools down after the heat has been removed.

In a second aspect of the present disclosure, there is provided a composite material formed as flakes having an average size of at least 1 $\mu m^2$, wherein the flakes comprise
  a substrate comprising amorphous carbon having a first side oppositely arranged a second side, and
  a graphene film arranged on at least the first side of the substrate.

It has surprisingly been found that by providing flakes with an average size of at least 1 $\mu m^2$, such as in the range of 1 $\mu m^2$-1 $mm^2$ or of at least 1 $mm^2$, such as in the range if 1-50 $mm^2$, several drawbacks associated with prior art graphene composites can be alleviated. For example, graphene nanoparticles (which are substantially smaller than the flakes of the present invention) generally suffers from poor conductivity.

The material disclosed in the second aspect of the present invention is advantageous in that it provides an improved conductivity compared to conventional graphene composites. Without wishing to be bound by any specific scientific theories, the improved conductivity is believed to be caused by the size of the flakes. It furthermore provides improved bulk properties as compared to larger sheets of material, such as sheets larger than 50 $mm^2$.

Yet another advantage of the composite material of the present disclosure is that it may be formed from abundant raw materials. Preferably, the composite material is obtainable from lignin sources, which are readily available, for example as by-products from the paper industry.

Flakes, as understood herein, are thin sheets of material which extends substantially more two dimensions than in a third, that is a having a width and depth that is substantially larger than its height. The flakes of the present disclosure should have an average size of at least 1 $\mu m^2$, understood herein as having a size of one of its major sides of at least 1 $\mu m^2$. This size is intended to denote a size which the flakes takes up in two dimensional space.

The size of the one side can be estimated as the width of the flake multiplied by the depth of the flake.

The flakes, as disclosed herein, comprises a substrate having a first side oppositely arranged a second side. The term substrate is herein intended to denote material intended to be, on at least one side, at least partially covered by a film of a different material having different properties than the first material. The substrate of the present disclosure generally consists of two side oppositely arranged of each other, i.e. having normal vectors pointing in two different and parallel directions.

In the present disclosure, the substrate comprises amorphous carbon. In some examples the substrate substantially consists of amorphous carbon. Amorphous carbon is known to a person skilled in the art. The thickness of the substrate may be typically in the range of 100 nm to 100 $\mu m$. The presence of amorphous carbon in the flakes can be identified using e.g. Raman spectroscopy, for example by the presence of D and G peaks and the D/G band ratio. Raman spectroscopy is known to a person skilled in the art.

The film, referred to herein, is intended to denote a thin layer of material at least partially covering at least one side of the substrate. The film comprises graphene. Graphene is a two-dimensional material known to a person skilled in the art. In some examples, the film may substantially cover at least one side of the substrate. Substantially cover is defined as covering, by at least one layer of graphene, at least 90% on the first side of the substrate, such as at least 95% of the first side of the substrate. In some examples, the film covers at least 20% of at least one side of the substrate, such as at least 30% of at least one side of the substrate, such as at least 35% of at least one side the substrate, such as at least 40% of at least one side of the substrate, such as at least 45% of at least one side the substrate, such as at least 50% of at least one side of the substrate, such as at least 55% of at least one side the substrate, such as at least 60% of at least one side of the substrate, such as at least 65% of at least one side the substrate, such as at least 70% of at least one side of the substrate, such as at least 75% of at least one side the substrate, such as at least 80% of at least one side of the substrate, such as at least 85% of at least one side the substrate.

The presence of graphene in the composite material may be identified using Raman spectroscopy, for example by identification of a 2D peak.

In some examples, the flakes may have an average size in the range of 1 mm$^2$-50 mm$^2$. In general, graphene materials, and in particular graphene composite materials are produced as either nanoparticles or large sheets having an average size of at least 50 mm$^2$. The nanoparticles typically suffer from poor electronic conductivity, whereas large sheets are disadvantageous in bulk applications. The inventor has found that by providing flakes according to the present disclosure having an average size in the range of 1 mm$^2$-50 mm$^2$, a composite material exhibiting a high conductivity can be achieved. Yet another advantage is that the flakes having an average size of 1-50 mm$^2$ is suitable for use in bulk applications. In some examples, the flakes may have an average size in the range of 1 mm$^2$-50 mm$^2$, such as in the range of 10 mm$^2$-25 mm$^2$.

In some examples, the flakes may have an average size in the range of 1 μm$^2$-50 mm$^2$, such as in the range of 1 μm$^2$-1 mm$^2$. The inventors have found that the above mentioned advantages are displayed also by these flakes.

In examples of the present disclosure, the film may comprise multilayer graphene. Multilayer graphene (also known as few layer graphene) comprises several monolayers, typically more than two layers monolayers of graphene. In some examples, the film consists of multilayer graphene. However, the film may typically further comprise a portion of amorphous carbon. The amorphous portion may be small, such as of less than 40%, by weight, of the total weight of the film. The film may, in some examples, comprise monolayer graphene and/or bilayer graphene In some examples, the composite material is obtainable from a lignin containing source. Lignin is an abundant resource, in particular since it is a by-product from the paper making industry. Both the film and the substrate of the composite material according to the second aspect of the present disclosure is obtainable from lignin by the process disclosed in the first aspect of the present disclosure.

In a third aspect of the present invention, there is provided an intermediate material, comprising
 a substrate comprising amorphous carbon having a first side oppositely arranged a second side, and
 a graphene film arranged on at least the first side of the substrate wherein one of the substrate and the graphene film is arranged on a metal surface.

The intermediate material may be obtained in the process disclosed in the first aspect of the present invention. By removing the substrate and graphene film from the metal surface the material according to the second aspect can be obtained.

In some examples, the graphene film is arranged on the metal surface. The intermediate material is preferably a layered material, comprising a first layer of a metal surface, a second layer of a film comprising graphene arranged on the first layer and a third layer of a substrate comprising amorphous carbon arranged on the second layer.

In order to form the composite material of the second aspect from the intermediate material, the step d) disclosed in relation to the first aspect can be used. The step d) may be performed either chemically, by removing the graphene film from the metal substrate using a chemical, such as an acid, preferably hydrochloric acid. The step d) may in other examples be performed mechanically, by removing the graphene from the metal substrate by mechanical means, such as by brushing. In some examples, electro-delamination may be used.

It should readily be understood that the invention relates to all possible features recited in the claims, unless clearly contradictory.

BRIEF DESCRIPTION OF APPENDED DRAWINGS

Figure 2:
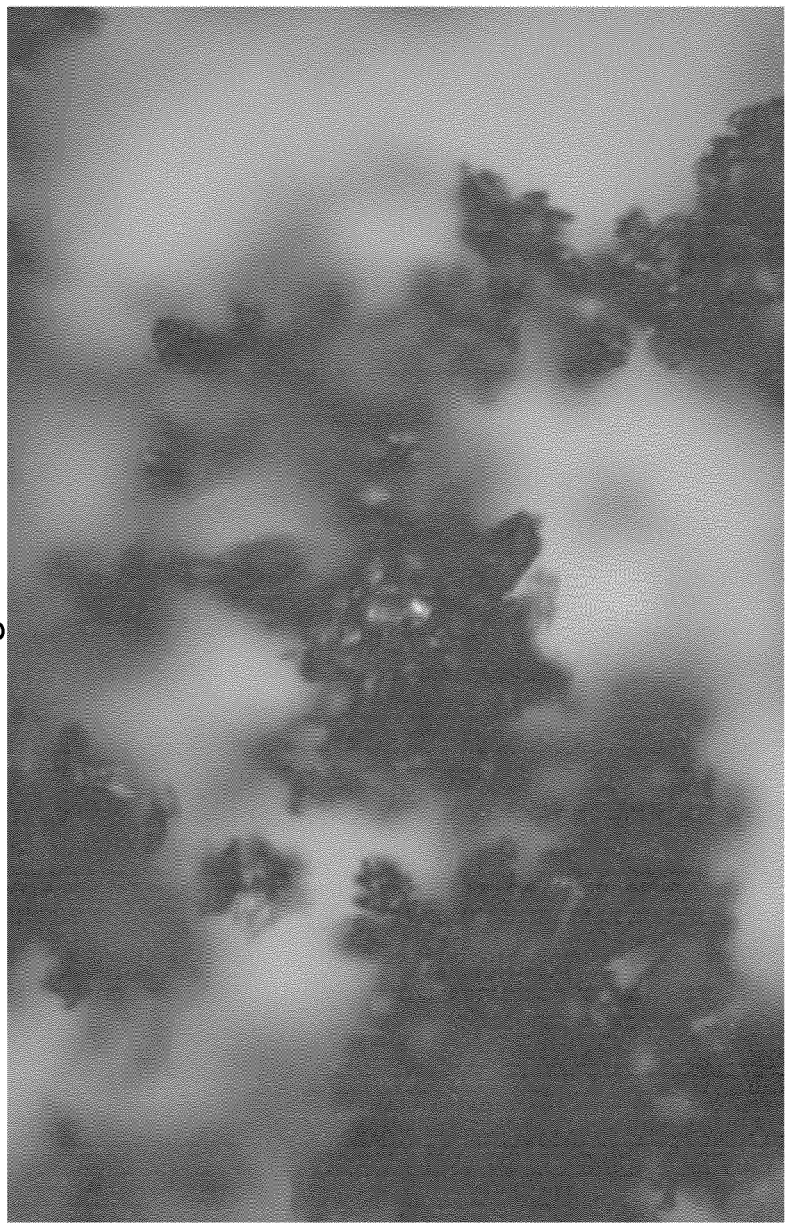
Figure 3:
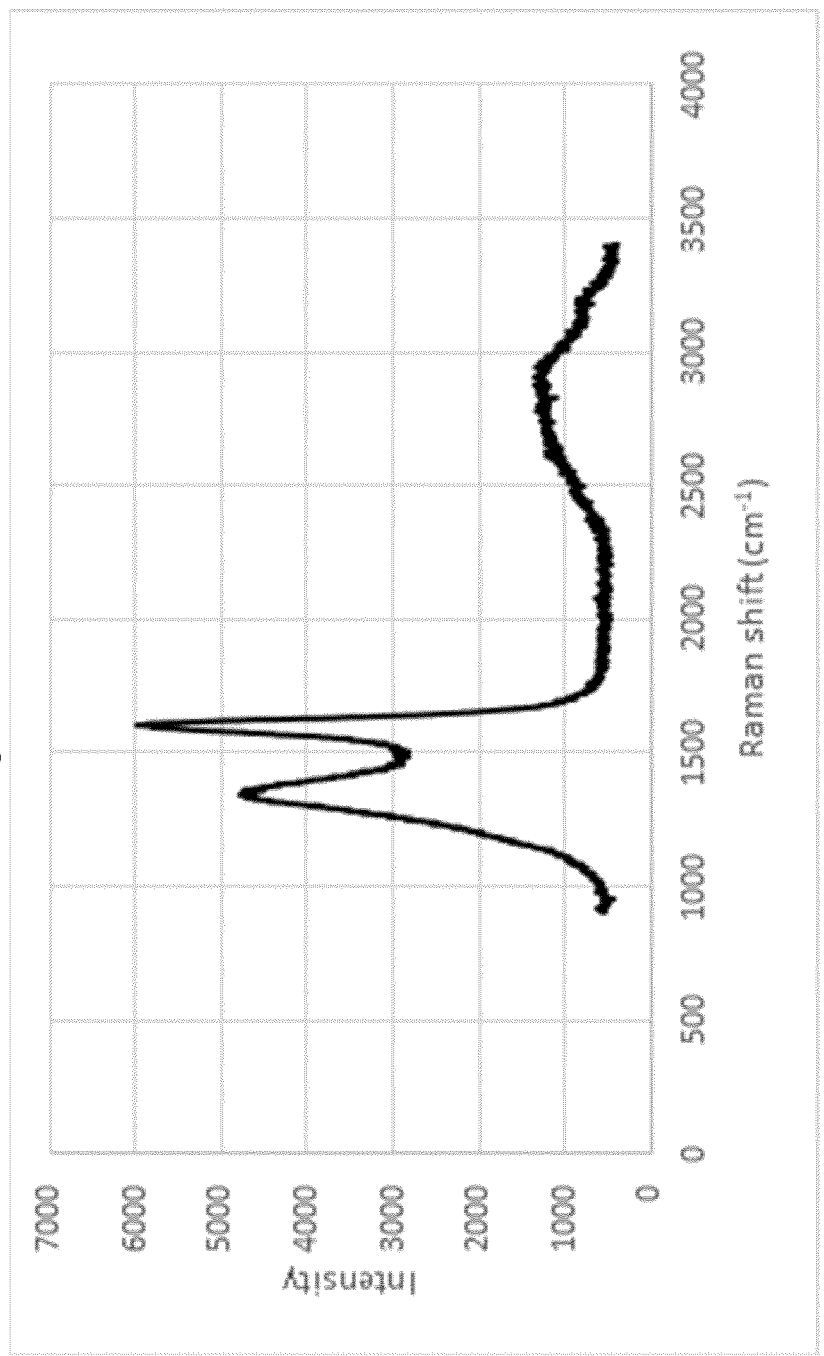
Figure 4:
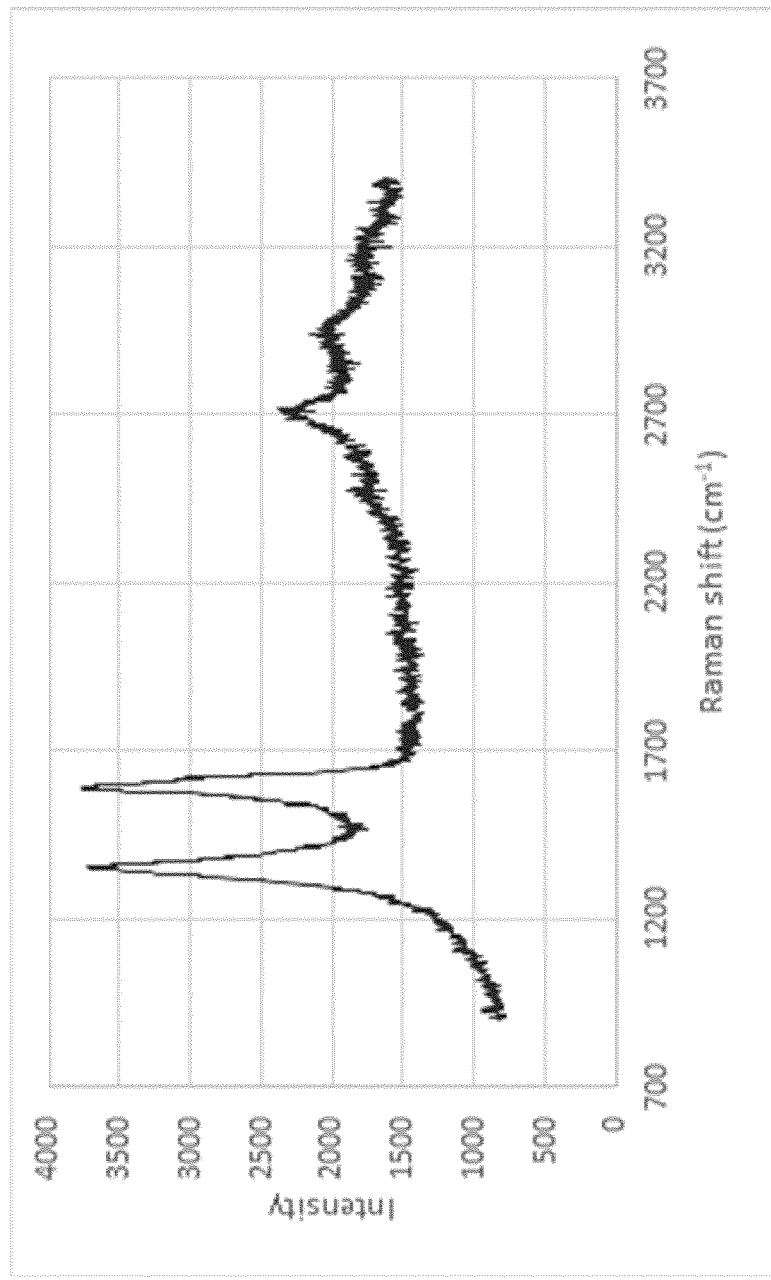
Figure 5:
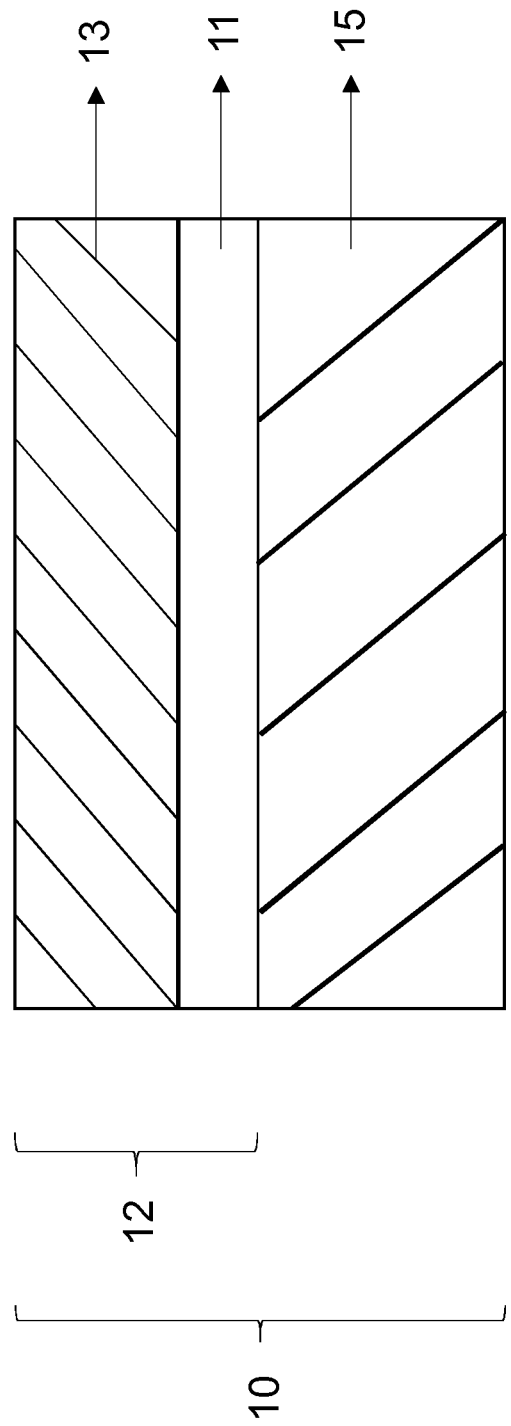
Figure 6:
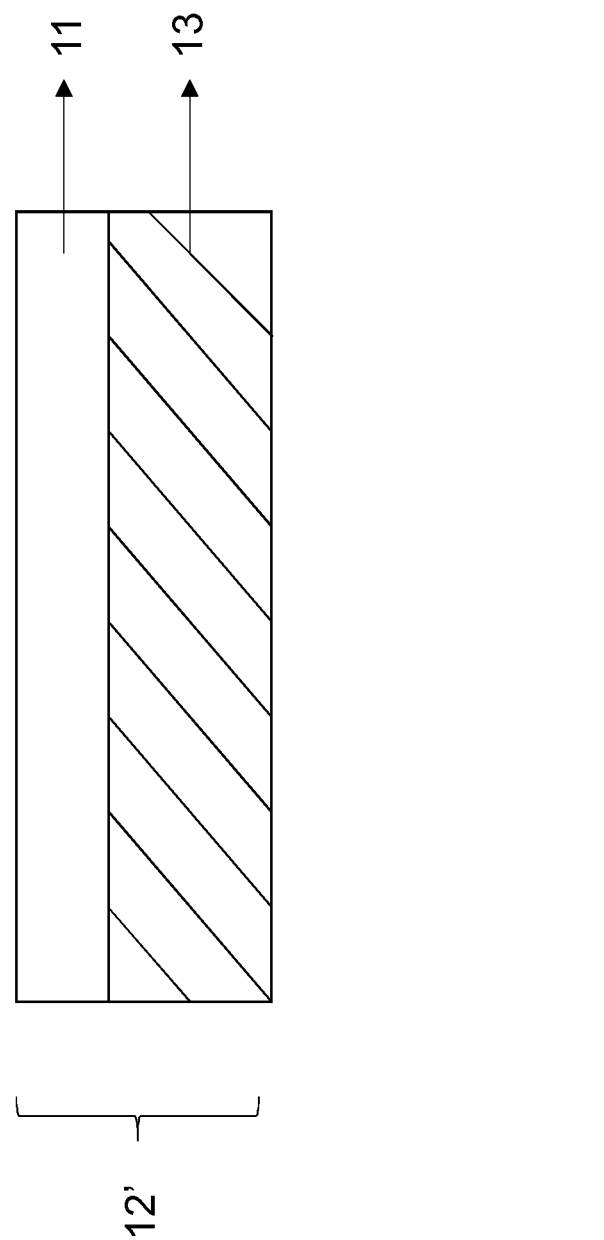

The invention will be described with reference to the following figures, in which
FIG. 1 shows a light optical microscope image of flakes according to the present disclosure, before the flakes have been removed from the copper surface;
FIG. 2 shows a light optical microscope image of flakes according to the present disclosure, after the flakes have been removed from the copper surface;
FIG. 3 shows a Raman spectrum of the flakes when they are still attached to copper;
FIG. 4 shows a Raman spectrum of the of the flakes after removal from the copper;
FIG. 5 shows a schematic cross-section of a flake according the present disclosure;
FIG. 6 shows a schematic cross-section the intermediate material according to the present disclosure.

DETAILED DESCRIPTION

The present invention will be described by way of the following, non-limiting examples Example 1

Sample Preparation
A carbon based composite material was prepared according to the following.
0.5 grams of particular lignin (Sigma Aldrich) was provided to a beaker along with 0.4 grams of deionized water, 0.05 g of poly(vinyl alcohol) (PVA) solution (10 mol-% PVA in water) and 1.05 g of isopropanol to form a slurry. The slurry was thereafter transferred to a ball mill (Planetary Mill Pulverisette) where the slurry was milled using grinding balls having a diameter in the range of 0.6-0.8 mm, in an amount of approximately two times the weight of the slurry. The slurry was milled in a scheme of 5×30 minutes, with a rest period of 15 minutes between each milling repetition. The milled slurry was thereafter collected from the mill using 60 ml a 1:1 solution of isopropanol and water.

After milling, the milled slurry was treated in an ultrasonic bath.

The milled slurry was thereafter deposited on a copper substrate, by drip coating the milled slurry onto the substrate to obtain a layer of slurry which substantially covered the copper substrate.

The slurry was then allowed to dry on the copper surface for approximately 30 minutes.

The slurry deposited copper surface was then heated in a tubular oven (Carbolite Gero) to a temperature of approximately 805° C. in an inert atmosphere of hydrogen gas and argon gas in an ratio of 0.05:0.95 at a flow of approximately 130 cc/min. The heat treatment was performed at 805° C. for approximately 20 minutes, after which the heat was turned off and the slurry deposited substrate was allowed to cool. The gas flow was lowered to 5 cc/min. When the temperature in the oven had decreased to 100° C., the gas flow was turned off. After this treatment, an intermediate product which comprised a carbon based composite material and the copper substrate was achieved.

The composite material was removed from the copper substrate by sinking the substrate into a container comprising 4.5 M hydrochloric acid to etch the copper and to form flakes of the carbon based composite material.

Light Optical Microscopy

FIGS. 1 and 2 shows a light optical micrograms of flakes obtained according to the present invention. FIG. 1 shows the composite material in its intermediate form when the flakes are still attached to a metal surface, in this case a copper surface. As can be seen in FIG. 1, the composite material substantially covers the copper substrate.

FIG. 2 shows the flakes of the present invention after removal from the metal substrate. It is clearly shown that the inventive method forms flakes of the composite material.

The materials shown in FIGS. 1 and 2 were investigated using Raman spectroscopy.

Raman Spectroscopy

Raman spectrum of the flakes before removal from the copper surface is shown in FIG. 3. Raman spectrum of the flakes after removal from the metal surface is shown in FIG. 4.

The Raman spectra was recorded with a Renishaw inVia Confocal Raman microscope with a 532 nm excitation wave length and constant power of 0.1% of the nominal maximum power of 500 mW. A 20× magnification objective was used and 20 cumulative acquisitions of 20 s for each single spectrum was taken.

The spectrum in FIG. 3 shows a D peak at 1350 cm$^{-1}$. The D peak represents the breathing mode of sp$^2$-hybridized carbon in rings at defects and grain boundaries. The spectrum also shows a G peak at 1590 cm$^{-1}$ indicating the in-plane vibration of sp$^2$-boned crystalline carbon. The D/G band intensity ratio is characteristic for amorphous carbon. No 2D peak is visible as the spectra was taken from the top surface, where the graphene structure is not visible since the flakes are still attached to the copper with the graphene film adjacent to the copper.

The spectrum in FIG. 4 shows a D peak at 1350 cm$^{-1}$. The D peak represents the breathing mode of sp$^2$-hybridized carbon in rings at defects and grain boundaries. The spectrum also shows a G peak at 1590 cm$^{-1}$ indicating the in-plane vibration of sp$^2$-boned crystalline carbon. The D/G band intensity ratio is characteristic for amorphous carbon. The 2D peak (2720 cm$^{-1}$) which is visible in FIG. 4 indicates the presence of few layer graphene. The spectrum furthermore shows a D+G peak at 2958 cm$^{-1}$.

Example 2

A second sample was prepared in the same manner as in Example 1, but instead of removing the flakes using hydrochloric acid a step of electro-delamination was used. The metal surface was used as a first electrode, a graphite electrode as a second electrode and a solution of 0.05 M NaOH was used as electrolyte. A current of 25 mA/cm$^2$ was then applied to the electrodes. The copper electrode was thereafter transferred to a container of MilliQ water which removed flakes of the composite material. The procedure was then repeated four times in order to remove all flakes from the copper surface.

Example 3

FIG. 5 shows a schematic illustration of a cross section of the intermediate material 10 according to the present disclosure. The intermediate material comprises a metal surface 15. Adhered to a first side of the metal surface 15 is the composite material, wherein the first side of the film 11 comprising graphene adheres to a first side the metal surface 15. The substrate 13 comprising amorphous carbon adheres to the other side of the film 11. The film and the substrate forms the composite material 12.

FIG. 6 shows a schematic illustration of a flake 10 according to the present disclosure, after the flake has been removed from the metal surface. The flake 12' comprises a substrate 13 comprising amorphous carbon having a first side onto which a film 11 comprising graphene is adhered.

Additionally, variations to the disclosed embodiments and examples can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Itemized List of Embodiments

1. A process for producing a composite material comprising a graphene film arranged on an amorphous carbon substrate, the process comprising the steps of
    a) providing a lignin source and an aqueous solution to form a composition
    b) depositing the composition on a metal surface
    c) heating the composition on the metal surface to form the composite material on the metal surface.
2. The process according to item 1, wherein the process further comprises a step d) removing the composite material from the metal surface to form flakes of the composite material.
3. The process according to any one of the preceding items, wherein the step a) further comprises providing a poly(vinyl alcohol) and an alcohol to the composition.
4. The process according to item 3, wherein the alcohol is isopropanol.
5. The process according the item 4, wherein the composition comprises, by weight of the composition
    10-30 weight-% of the lignin source
    1-5 weight-% of poly(vinyl alcohol)
    45-65 weight-% of isopropanol
    the balance comprising water.
6. The process according to any of the preceding items, wherein the lignin source is a particulate lignin source, and wherein the step a) further comprises milling of the composition.
7. The process according to any of the preceding items, wherein the metal surface is a copper surface.
8. The process according to any of the preceding items, wherein the step c) further comprises heating the composition on the metal surface to a reaction temperature in the range of 500-1100° C.
9. The process according to any of the preceding items, wherein the step c) is performed in an atmosphere comprising argon gas and hydrogen gas.
10. The process according to any items 2-7, wherein the flakes formed in step d) has an average size in the range of 1 mm$^2$-50 mm$^2$.
11. A composite material formed as flakes having an average size of at least 1 mm$^2$, wherein the flakes comprises
    a substrate comprising amorphous carbon having a first side oppositely arranged a second side, and a graphene film arranged on at least the first side of the substrate.

12. The composite material according to item 11, wherein the graphene film substantially covers the first side of the substrate.

13. The composite material according to any one of items 11-12, wherein the flakes has an average size in the range of 1 mm$^2$-50 mm$^2$.

14. The composite material according to any one of items 11-13, wherein the composite material is obtainable from a lignin containing source.

15. An intermediate composite material comprising
a substrate comprising amorphous carbon having a first side oppositely arranged a second side, and
a graphene film arranged on at least the first side of the substrate wherein one side of the substrate is arranged on a metal surface.

The invention claimed is:

1. A process for producing a composite material comprising a graphene film arranged on an amorphous carbon substrate, the process comprising the steps of a) providing a lignin source, a poly(vinyl alcohol), an alcohol, and an aqueous solution to form a composition;
b) depositing the composition on a metal surface; and
c) heating the composition on the metal surface to form the composite material on the metal surface.

2. The process according to claim 1, wherein the process further comprises a step d) removing the composite material from the metal surface to form flakes of the composite material.

3. The process according to claim 1, wherein the alcohol is isopropanol.

4. The process according the claim 3, wherein the composition comprises, by weight of the composition
10-30 weight- % of the lignin source
1-5 weight- % of poly(vinyl alcohol);
45-65 weight- % of isopropanol; and
the balance comprising water.

5. The process according to claim 1, wherein the lignin source is a particulate lignin source, and wherein the step a) further comprises milling of the composition.

6. The process according to claim 1, wherein the metal surface is made of a metal selected from copper, a copper alloy, aluminum and an aluminum alloy.

7. The process according to claim 1, wherein the metal surface is a copper surface.

8. The process according to claim 1, wherein the composition on the metal surface is performed at a reaction temperature in the range of 500-1100° C.

9. The process according to claim 1, wherein the step c) is performed in an atmosphere comprising argon gas and/or hydrogen gas.

10. The process according to claim 1, wherein the step c) is performed in an atmosphere comprising argon gas and hydrogen gas.

11. The process according to claim 2, wherein the flakes formed in step d) have an average size in the range of 1 μm$^2$-50 mm$^2$.

12. The process according to claim 11, wherein the flakes formed in step d) have an average size in the range of 1 μm$^2$-1 mm$^2$.

13. The process according to claim 11, wherein the flakes formed in step d) have an average size in the range of 1 mm$^2$-50 mm$^2$.

14. A process for producing a composite material comprising a graphene film arranged on an amorphous carbon substrate, the process comprising the steps of
a) providing a lignin source and an aqueous solution to form a composition;
b) depositing the composition on a metal surface;
c) heating the composition on the metal surface to form the composite material on the metal surface; and
d) removing the composite material from the metal surface to form flakes of the composite material;
wherein the flakes formed in step d) have an average size in the range of 1 μm$^2$-50 mm$^2$.

15. The process according to claim 14, wherein the lignin source is a particulate lignin source, and wherein the step a) further comprises milling of the composition.

16. The process according to claim 14, wherein the metal surface is made of a metal selected from copper, a copper alloy, aluminum, and an aluminum alloy.

17. The process according to claim 14, wherein the metal surface is a copper surface.

18. The process according to claim 14, wherein heating the composition on the metal surface is performed at a reaction temperature in the range of 500-1100° C.

19. The process according to claim 14, wherein the step c) is performed in an atmosphere comprising argon gas and/or hydrogen gas.

20. The process according to 22, wherein the flakes formed in step d) have an average size in the range of 1 μm$^2$-1 mm$^2$.

* * * * *